May 18, 1965 E. A. FERRIS 3,183,650
VEGETATION CUTTING APPARATUS
Filed April 25, 1963
2 Sheets-Sheet 1

INVENTOR.
EDMUND A. FERRIS
BY
Carlsen, Carlsen & Sturm
ATTORNEYS

May 18, 1965 E. A. FERRIS 3,183,650
VEGETATION CUTTING APPARATUS
Filed April 25, 1963 2 Sheets-Sheet 2

INVENTOR.
EDMUND A. FERRIS
BY
Carlson, Carlson + Sturm
ATTORNEYS ated May 18, 1965

3,183,650
VEGETATION CUTTING APPARATUS
Edmund A. Ferris, Chippewa Falls, Wis., assignor to Bros Incorporated, Minneapolis, Minn., a corporation of Minnesota
Filed Apr. 25, 1963, Ser. No. 275,659
4 Claims. (Cl. 56—25)

This invention relates generally to the cutting of vegetation and is more particularly concerned with the cutting of vegetation through the use of a method and apparatus which utilizes electrical energy as a means for cutting or severing vegetation.

In the prior art with which my invention is concerned, a common method of cutting vegetation, such as grass, crops, or the like, has been to utilize a mechanical shearing process which requires the use of some form of cutting edge. An example of such apparatus is the rotary lawn mower, which has come into use in the last decade or so, in which a knife-like cutting edge is rotated to provide a high velocity with respect to the vegetation to be cut and the resultant shearing action effects a severing of the vegetation at the point of contact. Aside from being inherently dangerous due to the engagement and propulsion of particles of matter at relatively high velocities, the efficiency of such apparatus is rapidly decreased with wear occasioned by engagement of the cutting edge with the vegetation and other objects.

Another form of prior art apparatus which has also been in common use is the sickle bar in which a shearing action is provided by the reciprocation of a plurality of cutting teeth across a plurality of stationary teeth and operation similar to that performed by the household scissors is obtained and vegetation is severed when engaged between the knife and stationary blade and the resultant reciprocating motion shears the vegetation at the point of engagement between the stationary and movable blades.

In my invention a method and apparatus is provided which eliminates the necessity for any moving parts or surfaces for performing the actual cutting or severing operation on vegetation which is growing or is in contact with the ground.

It is therefore an object of my invention to provide an improved method for cutting vegetation.

Another object of my invention is to provide novel apparatus for cutting or severing vegetation.

Briefly my invention comprises a source of electrical energy which is connected intermediate the ground, or earth, which is in contact with vegetation to be cut and a conductor which may be moved into contact with the vegetation according to the wishes of an operator to thereby sever or cut the vegetation at the point of contact or engagement therewith.

These and other more detailed and specific objects will be disclosed in the course of the following specification, reference being had to the accompanying drawings, in which—

Figure 1:
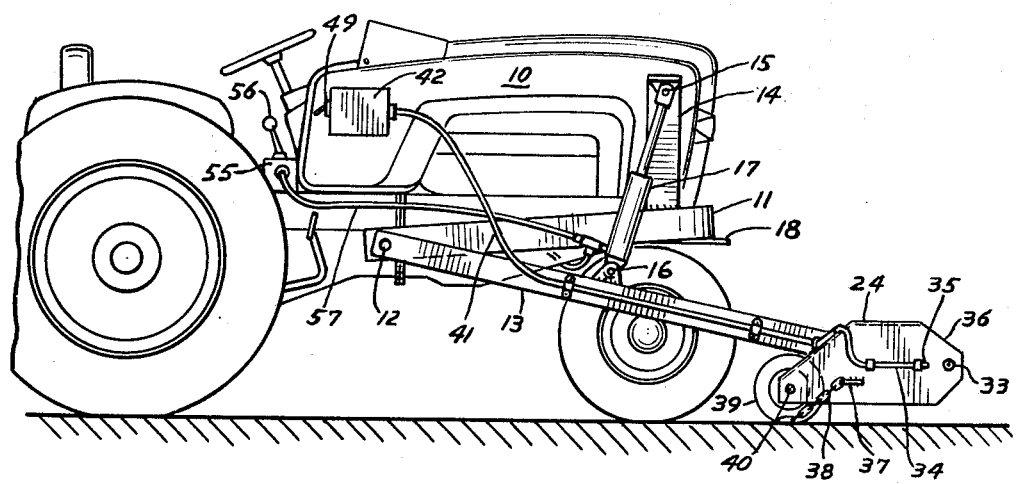
FIG. 1 is a side elevational view of one embodiment of my invention mounted on a vehicle.
Figure 2:
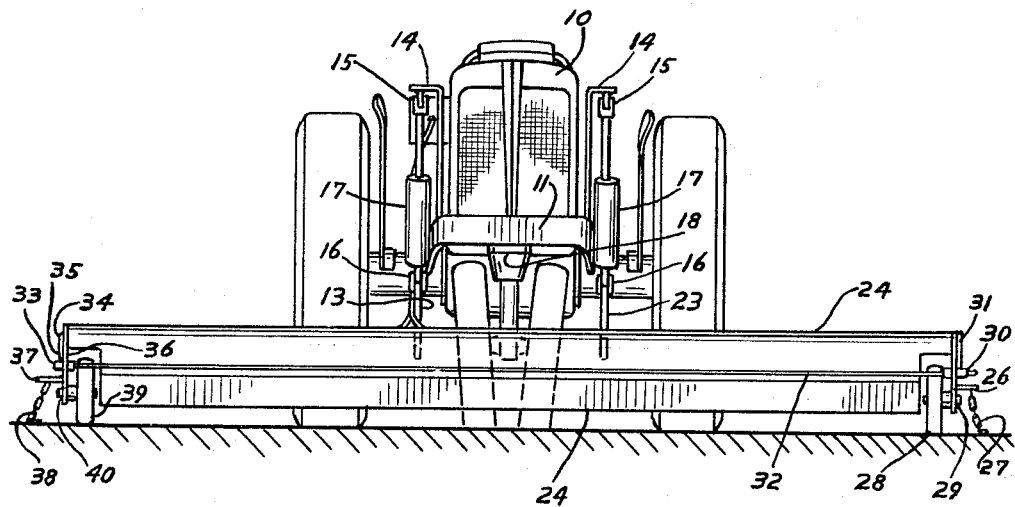
FIG. 2 is a front elevational view of the apparatus shown in FIG. 1.
Figure 3:
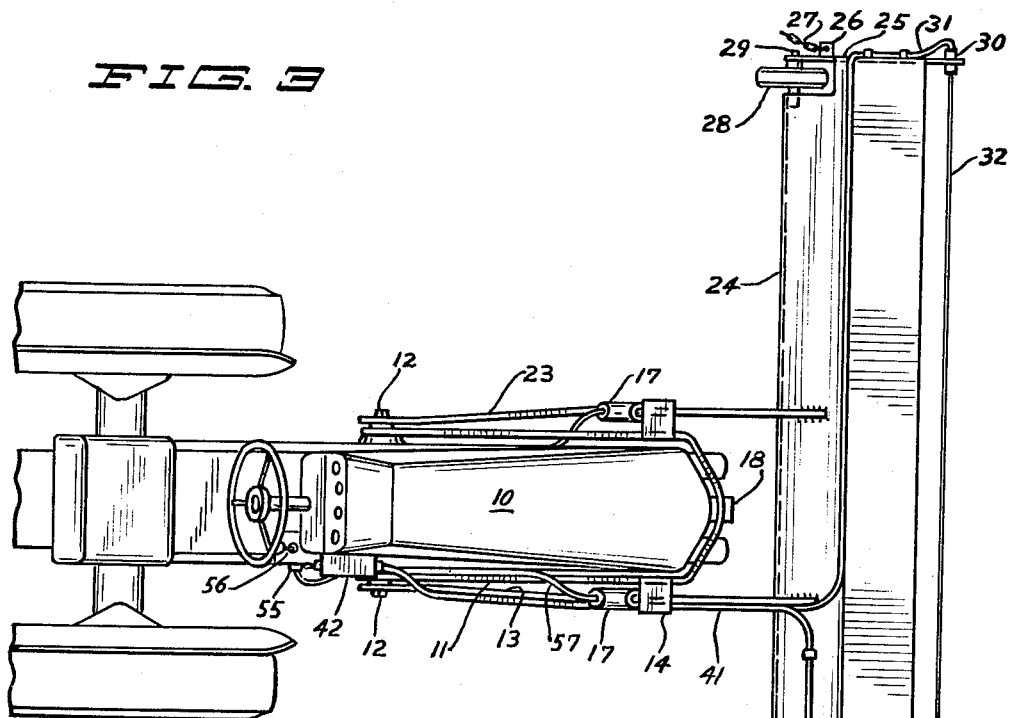
FIG. 3 is a top plan view of the apparatus shown in FIGS. 1 and 2.

Referring now to the drawing in which like elements have been identified by like reference characters, my invention is shown embodied in a transversely extending vegetation cutting assembly which is adjustably suspended from the body of a suitable movable vehicle shown in the form of a farm tractor. A transversely extended and elongated housing member 24, having a pair of end plate members 25 and 36, is securely attached, as by welding, to a pair of rearwardly and upwardly extending support members 13 and 23 which are attached at their rearward end to pivot pins 12 positioned on both sides of the frame of tractor 10. A generally U-shaped frame member 11 having a pair of generally vertically extending mounting members 14 is also rotatably journaled on pivot members 12 and in the position shown in the drawings rests with its forward portion on the top of a stop member 18 which extends forwardly of the frame of tractor 10 and is suitably attached thereto. A pair of hydraulic cylinders 17 are positioned intermediate the top ends of pivot pins 15 on members 14 and suitably positioned pivot pins 16 on support members 13 and 23. Hydraulic cylinders 17 are suitably connected in parallel through conduit 57 to a control valve 55 having an operating handle 56 and which is connected to a source of hydraulic fluid under pressure (not shown) for adjustably positioning the transverse cutting assembly with respect to the earth over which tractor 10 is operated.

The end plate members 25 and 36 on housing 24 are generally similar and are spaced apart a desired distance to determine the width of vegetation to be cut at one time. End member 25 includes an earth engaging wheel 28 suitably journaled in mounting means 29, an outwardly extending portion 26 to which is connected a flexible conductive earth engaging member 27, and an insulated terminal 30. End plate member 36 includes an earth engaging wheel 39 suitably journaled on mounting means 40, an outwardly extending member 37 to which is attached a flexible conductive earth engaging member 38, a terminal 33, and an insulated terminal 35. A non-insulated vegetation engaging conductor 32 is mounted intermediate insulated terminals 30 and 33 on end plate members 25 and 36 respectively.

A power supply means 42, including an on-off switch 49, is shown connected to terminals 30 and 35 through suitable cable 41 which contains a pair of conductors 31 and 34 connected to terminals 30 and 35 respectively.

It may thus be seen that a movable non-insulated conductor member 32 and earth engaging members 27 and 38 are connected to a source of electrical energy 42. Energization of the source of electrical energy provides a means for establishing a potential difference between the earth, and therefore vegetation to be cut, and conductor 32 whereby when engagement of vegetation by conductor 32 occurs, a cutting, or severing, of the vegetation is readily obtained.

Figure 4:
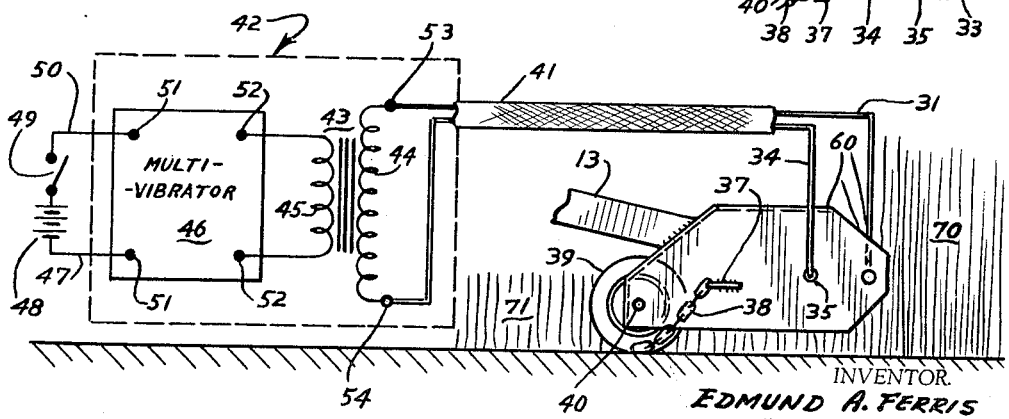
FIG. 4 is an electrical schematic diagram illustrating a typical source of electrical energy connected to the apparatus shown in FIGS. 1, 2 and 3.

In FIG. 4 there is shown an electrical schematic diagram of a power supply 42 as might be utilized in carrying out the principles of my invention. Power supply 42 includes a multivibrator 46, which may be, for instance, a conventional electro-mechanical vibrator as utilized in mobile communications equipment, and contains a pair of input terminals 51 and a pair of output terminals 52. Input terminals 51 are connected to a suitable source of electrical energy, for example, battery 48, through conductors 47 and 50 and switch means 49. Output terminals 52 on multi-vibrator 46 are connected to primary winding 45 on transformer 43. Transformer 43 has a secondary winding 44 connected to a pair of output terminals 53 and 54 which are in turn connected to conductors 31 and 34, respectively, in cable 41. As described above, conductor 31 is connected to conductor 32 through insulated terminal 30 and conductor 34 is connected to mounting means 24 and serves as a ground through flexible conductors 27 and 28 to establish a potential difference between conductor 32 and the vegetation to be cut. As illustrated in FIG. 4, vegetation 70 which may be, for example, grass on a golf course, is engaged by forward movement of conductor 32 and its mounting means and trimmed to a height as indicated by reference character 71.

While the exact phenomena occurring at the time and point of contact of conductor 32 with vegetation is not understood, it has been determined that satisfactory operation in severing crops such as grass, hay, and the like, may be obtained where the potential applied to conductors 31 and 34 is in the range of 2500 to 15,000 volts. The power requirement may vary with the application to which my invention is applied and it is believed that once an understanding of my invention is clear to one skilled in the art, a determination of the various operating parameters of voltage and current may easily be made through the expedient of simple experiments. In one apparatus as shown in FIG. 4, a six volt direct current source of power, such as a storage battery 48, was utilized to energize transformer 43 which was constructed to provide an output of 2500 volts.

It may be apparent to those skilled in the art that other forms of power supply may be utilized. In one operative embodiment, a power supply capable of providing pulses having high energy content and which were of a unidirectional, direct current characteristic, as distinguished from the alternating current embodiment of FIG. 4, provided satisfactory operation of cutting of vegetation. In such an application a pulse direct current high potential power supply of 15,000 volts at a current of .75 ampere provided satisfactory cutting of the grass commonly found in parks and on golf courses.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Apparatus for cutting vegetation, comprising in combination: a source of electrical energy exhibiting vegetation severing potential and current characteristics; a conductor; means supporting said conductor for movable engagement with vegetation to be cut; and circuit means connecting said source of electrical energy intermediate said conductor and the ground in which vegetation to be cut is growing whereby the electrically energized conductor cuts the vegetation and thereafter the rooted portion of the cut vegetation is capable of continued growth.

2. The apparatus of claim 1 in which the source of electrical energy is of relatively high potential.

3. In combination with a movable vehicle; a transversely extending mounting means including a pair of spaced end plate members, said mounting means exhibiting current conductive characteristics and being mounted in vegetation engaging position on a vehicle; a conductor mounted between and insulated from said end plate members; means mounted on said mounting means for continuously conductively engaging the earth; and power supply means connected intermediate said conductor and said mounting means.

4. The apparatus of claim 3 in which the power supply means provides a relatively high potential output.

References Cited by the Examiner
UNITED STATES PATENTS

| | | | |
|---|---|---|---|
| 593,235 | 11/97 | McBride | 47—1.3 |
| 728,312 | 5/03 | Smith | 47—1.3 |
| 2,333,224 | 11/43 | Agnew | 47—1.3 X |
| 2,375,458 | 5/45 | Agnew et al. | 47—1.3 X |
| 2,682,729 | 7/54 | Poynor | 47—1.3 |
| 2,916,866 | 12/59 | Brinkman | 56—25 |

T. GRAHAM CRAVER, *Primary Examiner.*
RUSSELL R. KINSEY, *Examiner.*